US009064097B2

(12) United States Patent
Sambamurthy

(10) Patent No.: US 9,064,097 B2

(45) Date of Patent: Jun. 23, 2015

(54) SYSTEM AND METHOD OF AUTOMATICALLY DETECTING OUTLIERS IN USAGE PATTERNS

(75) Inventor: Govinda Raj Sambamurthy, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 314 days.

(21) Appl. No.: 13/490,069

(22) Filed: Jun. 6, 2012

(65) Prior Publication Data

US 2013/0333046 A1 Dec. 12, 2013

(51) Int. Cl.

*G06F 21/00* (2013.01)
*G06F 21/10* (2013.01)

(52) U.S. Cl.

CPC .................................... *G06F 21/10* (2013.01)

(58) Field of Classification Search

USPC ........................................................ 726/26

See application file for complete search history.

(56) References Cited

U.S. PATENT DOCUMENTS 6,334,121 B1 12/2001 Primeaux et al.
6,731,238 B2 5/2004 Johnson
7,043,755 B1 * 5/2006 Roger et al. .................... 726/22
7,062,415 B2 6/2006 Whitefield et al.
7,200,575 B2 4/2007 Hans et al.
8,402,003 B2 * 3/2013 Biran et al. .................. 707/688
2002/0087554 A1 7/2002 Seelinger
2004/0220838 A1 11/2004 Bonissone et al.
2008/0011569 A1 1/2008 Hillier et al.
2008/0174426 A1 7/2008 Hackworth et al.
2012/0151585 A1 * 6/2012 Lamastra et al. ............... 726/24
2013/0173309 A1 * 7/2013 Dworkin ........................... 705/3
2013/0263206 A1 * 10/2013 Nefedov et al. ................... 726/1
2013/0297346 A1 * 11/2013 Kulkarni ........................... 705/3

OTHER PUBLICATIONS

Patcha, et al., An Overview of Anomaly Detection Techniques: Existing Solutions and Latest Technological Trends, Accepted Manuscript, Computer Networks, Feb. 9, 2007, 24 pages.

Fei, et al., Information Audit System Based on Fuzzy Neural Networks, Control Conference, CCC 2006, Aug. 2006, pp. 1132-1136 Retrieved from the Internet: <http://ieeexplore.ieee.org/xpl/login.jsp?tp=&arnumber=4060256&url=http%3A%2F%2Fieeexplore.ieee.org%2Fxpls%2Fabs_all.jsp%3Farnumber%3D4060256>.

Reddy, et al., A Study of Intrusion Detection in Data Mining, Manuscript, Revised Feb. 24, 2011, 6 pages.

Winn, Fraud Detection—A Primer for SAS® Programmers, Data Mining and Predictive Modeling, Paper 080-31, 6 pages.

* cited by examiner

*Primary Examiner* — Christopher Revak

(74) *Attorney, Agent, or Firm* — Tucker Ellis LLP

(57) ABSTRACT

A system and method for detecting an outlier in a usage pattern comprises a computer accessible to perform an operation. The system includes an audit forensics engine having an outlier detection module. When an instance occurs where the operation is performed, audit trail data is captured related to the operation. The outlier detection module determines for the instance where the operation is performed whether the instance is an outlier in a usage pattern based on a comparison of the audit trail data to the usage pattern.

17 Claims, 2 Drawing Sheets

SYSTEM AND METHOD OF AUTOMATICALLY DETECTING OUTLIERS IN USAGE PATTERNS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and methods, and is particularly related to detecting abnormal behavior in computer systems.

BACKGROUND

Enterprise Content Management ("ECM") is the strategies, methods and tools used to capture, manage, store, preserve, and deliver content and documents related to organizational processes within and among computer systems. ECM covers the management of information within the entire scope of an enterprise whether that information is in the form of a paper document, an electronic file, a database print stream, or even an email. ECM encompasses document management, web content management, search, collaboration, records management, digital asset management, work-flow management, capture and scanning.

ECM is necessary to an organization for several reasons. One reason is the need to comply with regulations such as Sarbanes-Oxley or the Health Insurance Portability and Accountability Act. A proper compliance strategy ensures that proper business practices are followed and that content is properly captured, stored, managed, and disposed of at the appropriate and legal time in its lifecycle. Another reason is to effectively enable collaboration between individuals. Strong collaboration requires utilizing technologies (e.g. instant messaging, whiteboards, online meetings, email) that allow work to take place wherever and whenever needed. Another reason is to improve an organization's efficiency and drive down the cost of doing business by, for example, reducing business process delays and improving customer service interactions.

ECM is primarily aimed at managing the life-cycle of information from initial publication or creation all the way through archival and eventually disposal. ECM applications are delivered in three ways: on-premise software (installed on the organization's own network), Software-as-a-Service (web access to information that is stored on a vendor's system), or a hybrid solution composed of both on-premise and off-premise components. ECM aims to make the management of corporate information easier through simplifying storage, security, version control, process routing, and retention. The benefits to an organization include improved efficiency, better control, and reduced costs.

SUMMARY

In accordance with an embodiment of the invention, a system for detecting an outlier in a usage pattern comprises a computer accessible to perform an operation, with an audit forensics engine having an outlier detection module. When an instance occurs where the operation is performed, audit trail data is captured related to the operation. The outlier detection module determines for the instance where the operation is performed whether the instance is an outlier in a usage pattern based on a comparison of the audit trail data to the usage pattern.

In accordance with an embodiment of the invention, a system for detecting an outlier in a usage pattern comprises system management accessible to perform changes in modules of the system management. The management system includes an audit forensics engine having an outlier detection module. When an instance occurs where any operation is performed on a module, audit trail data are captured related to the operation. The outlier detection module determines for the instance where the operation is performed on the module whether the instance is an outlier in a usage pattern based on a comparison of the audit trail data to the usage pattern.

In accordance with an embodiment of the invention, a system for detecting an outlier in a content usage pattern comprises a content management system accessible to perform an operation on a content item. The content management system includes an audit forensics engine having an outlier detection module. When an instance occurs where any operation is performed on the content item, audit trail data are captured related to the operation. The outlier detection module determines for the instance where the operation is performed on the content item whether the instance is an outlier in a content usage pattern based on a comparison of the audit trail data to a content usage pattern of the content item.

In embodiments of the invention, the audit forensics engine has a pattern recognition module and/or the content management system includes a content policy file. The pattern recognition module analyzes audit trail data related to previous instances wherein the operation is performed on the content item and the content policy file includes rules. The content usage pattern is automatically determined based on one or both of the analysis of the pattern recognition module and the rules of the content policy file.

In some embodiments, the content management system includes an audit framework, a content repository storing the content item, and an audit repository for storing audit trail data.

In accordance with another embodiment, a method of detecting an outlier in a content usage pattern comprises the steps of receiving an instruction to perform an operation on a content item, accessing content items within a content management system including an audit forensic engine having an outlier detection module, performing the operation on the content item and capturing audit trail data related to the operation. The audit trail data are compared to a content usage pattern of the content item to determine whether the instance is an outlier in a content usage pattern.

In embodiments, the audit forensics engine has a pattern recognition module and/or the content management system includes a content policy file, and the method further comprises one or both of analyzing audit trail data related to previous instances wherein the operation is performed on the content item and determining the content usage pattern based on the analysis of the pattern recognition module, and determining the content usage pattern based on the content policy.

In embodiments, the content management system includes an audit framework, a content repository storing the content item, and an audit repository for storing audit trail data, and the method further comprises accessing the content item from the content repository prior to performing the operation on the content item and retrieving audit trail data related to previous instances prior to analyzing audit trail data related to previous instances, storing the audit trail data related to the operation in the audit repository, analysis to determine outliers, and notifying a content administrator of the content item when the content item is determined to be an outlier.

DETAILED DESCRIPTION

Figure 1:
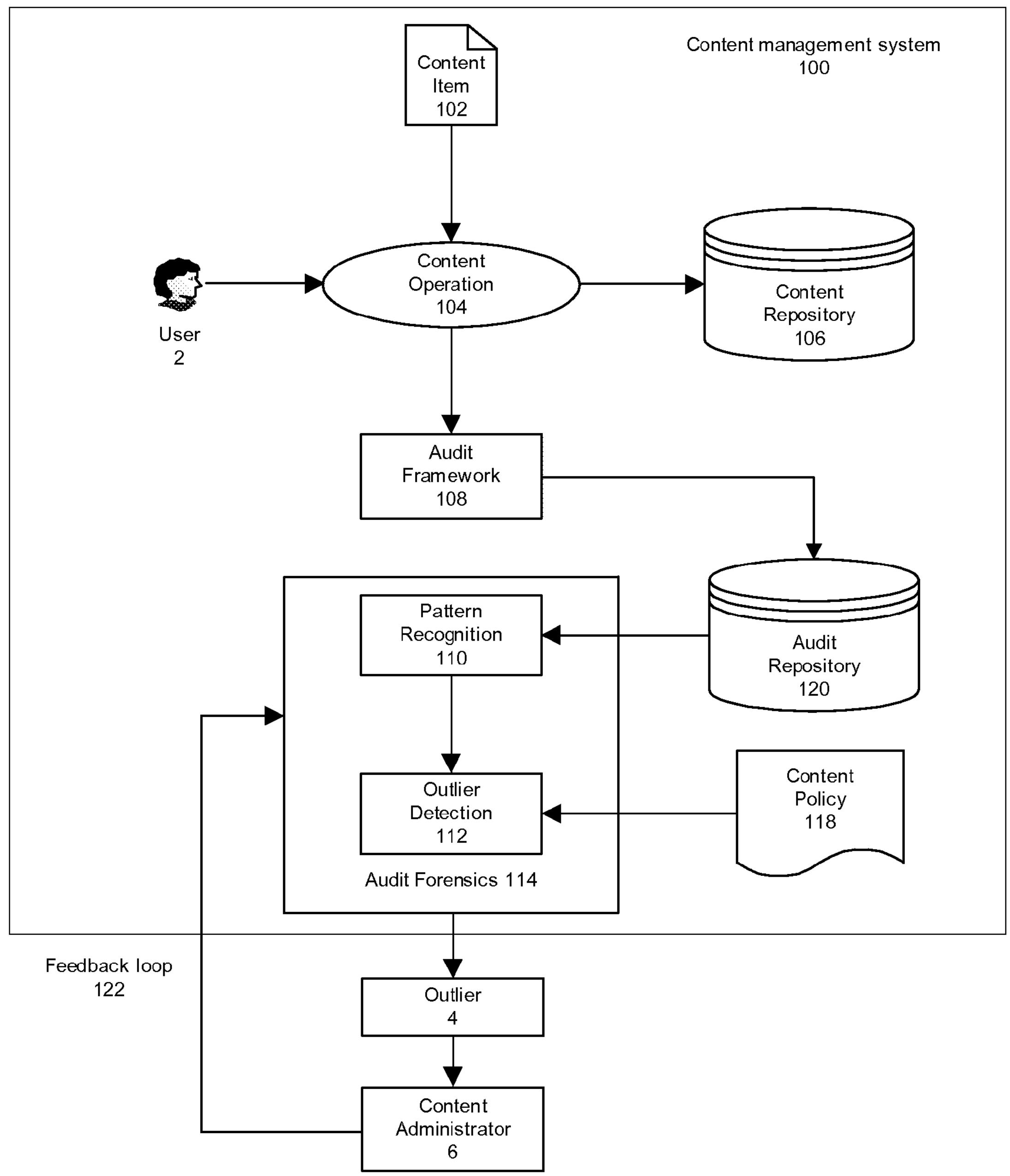
FIG. 1 shows an illustration of a content management system that includes audit forensics features in accordance with an embodiment of the invention.

Content management systems, including ECM systems, often track changes in content items. For example, ORACLE® ECM suite provides various mechanisms to track changes to a content item. ORACLE® Universal Content Management ("UCM") stores information about different revisions of the content item, such as the user who made the revision and the timestamp when a specific revision was modified. The metadata for each revision is also stored by default. In addition, ORACLE® Universal Record Management ("URM") captures various metadata changes to a specific record. A Content Tracker component provides data about access to different types of content items stored within the content server. Further, Service Call configuration can capture within the content server the binder parameters within named service calls. An audit framework provides an audit feature that can capture an audit trail of various revisions of documents as well as content management entities such as folders, classification, etc. Over a period of time, the audit trail and metadata audit trail can provide useful information on the content items.

Content management systems have security permissions that provide proactive access control. User access privileges to information, including the content items and folders a user is permitted to access, the times during which the user is permitted to access the content, the tools a user is permitted to use to access the content, etc., can all be defined and controlled by an administrator. However, this does not prevent a user who is exercising permission from misusing access to confidential content. Insider trading is not uncommon and sensitive content can be released in a variety of circumstances including industrial espionage and the leaking of politically-sensitive documents (e.g., the passing on of United States State Department cables to WikiLeaks and subsequent release by WikiLeaks). Even potentially nondestructive behavior may violate business policy. For example, within a content management system, if a specific folder containing financial documents is expected to be modified only within a given quarter, any changes to the document after the quarter requires additional investigation. The changes may have been made by a user with proper access privileges, but such actions may require internal and/or external auditing based on the business policy. The changes may be found to be legitimate, or a violation of policy.

There is currently no system and/or method to identify instances of malicious access to documents beyond a normal time window. Given the vast volume of content access data collected by many content management systems, manual review of content access data is impractical. Indeed, modern day enterprises store terabytes of information in their content management systems. Sifting through huge amounts of content access data manually to determine outliers would therefore be costly.

Embodiments of systems and methods in accordance with the present invention can be applied to detect outliers in a content usage pattern. Such embodiments can use audit trail data to detect possible instances of misuse of access and privileges on content items. In some embodiments, historical content audit trail data can be analyzed to identify patterns of normal usage of content items. Recognition of such patterns can be useful in detecting and determining behavior that violates policy.

In the above example, where a specific folder containing financial documents is expected to be modified only during a given quarter, the normal time period of document modification can be ascertained by correlating the specific folder and changes related to documents within that specific folder based on audit trail data. Once the content usage pattern is ascertained, outliers can be flagged. Outliers to the content usage pattern of operations on document items can be used to determine possible fraudulent access and/or changes to a document item that would require audit forensic analysis. Content usage patterns can be identified through statistical analysis. For example, the content usage pattern can be identified by computing the normal distribution of a set of audit trail data pertaining to content item usage. Audit trail data falling outside of the range of a standard deviation, for example, can be identified as outliers. Alternatively or additionally, the content usage pattern can be pre-defined as rules. The rules can be expressed declaratively for various content items. This can be useful, for example, in scenarios where the content usage pattern may be hard to detect from the audit trail data or if the administrator wants to define the content usage pattern, particularly where the rules are easily defined. The content usage pattern can be pre-defined as rules by the administrator through a graphical user interface (GUI) or can be declaratively defined as a configuration file such as XML.

For the example of the specific folder containing financial documents, assume that a content usage pattern can be established by way of statistical analysis that modification of any document within that folder should fall within the calendar interval of the quarter. Any content modification that is done outside this calendar interval is marked as an outlier. Such pattern recognition and outlier identification can be highly useful in forensics of misuse of content items that have legal, financial or compliance requirements. Once the outliers are detected, these can be verified manually to determine if the changes were indeed necessitated by a business requirement of if these changes correspond to fraud. Alternatively or additionally, a rule can be defined by the administrator identifying any operation on the content item outside of a calendar interval of a specific quarter as an outlier, or identifying only a modification of the content item outside of the calendar interval of the quarter as an outlier.

Referring to FIG. 1, an embodiment of a system in accordance with the present invention for detecting an outlier in a content usage pattern is shown. The system comprises a content management system 100 with an audit forensics engine 114 enabled. A user 2 accesses a content item 102, which can be stored in a content repository 106. The content repository 106 can be a file store provider or a database maintained in any storage medium local to or remote from a server, or other computing device that facilitates access to the content item 102. As the user 2 performs operations 104 on a content item 102, data related to the operations are captured by an audit framework 108 within the content management system 100. Content operations 104 can include, but are not limited to, such operations as check in, update, edit, view, archive, modify metadata (e.g., update the taxonomy of metadata), folder operations, and delete. Content operations 104 can also include the addition of documents to the content repository 106. Audit trail data related to the content operation 104, and collected by the audit framework 108, are a trail of what happened to the content item and can include such information as who performed the operation, what was the operation, when was the operation performed, what content item was the operation performed on, etc. The audit trail data related to the content operation 104, stored in the audit repository 120, are fed into a pattern recognition module 110, which is a data mining engine that can identify content usage patterns of the content item 102 that the operation was performed on. The pattern recognition module 110 can determine the content usage pattern by performing statistical analysis on the content usage data which can be found, for example, as historical audit trail data in an audit repository 120.

Performing an operation on a content item 102 can trigger a need to perform a statistical analysis by executing statistical algorithms using the pattern recognition module 110. The statistical analysis is typically not performed synchronously to the content operation, as synchronous analysis can be costly given the volume of operations and the volume of audit trail data within an audit repository. Rather, the time of execution of the statistical analysis can be based on one or more of several factors. The factors may include, but are not limited to, audit repository size, nature of the operation, frequency of operations being performed on the content item, criticality of the content item to business operation, and sensitivity of the content item. Thus, for example, where an operation is typically performed on the content item multiple times daily and the sensitivity of the content item is low, the statistical analysis may be performed once per week or month. Or, for example, where the sensitivity of the content item is high and the nature of the operation is an edit, the statistical analysis can be performed once per day, or even when triggered. Typically, though not necessarily, the frequency with which the statistical analysis is performed is defined by an administrator.

Referring again to FIG. 1, the audit forensics engine 114 can also obtain the content usage pattern from one or more content policy files 118. The content policy files 118 include the rules that define the content usage pattern for operations on content items. The rules can vary among operations, and among content items. The rules of the content policy files 118 can supplant the statistical analysis performed by the pattern recognition module 110, or the rules of the content policy files can supplement the statistical analysis, for example where outliers are defined by multiple conditions. The content policy files 118 can be defined by a content owner, by a content administrator, or by some other responsible party, and can be entered by way of code, a graphical user interface, or any other input technique.

In the example of the specific folder containing financial documents (e.g. invoices), the content usage pattern can be detected by computing, using the pattern recognition module 110, a distribution curve of audit trail data related to modifications on all content items within the specific folder. Where a significant amount of modifications are performed within the calendar interval of a financial quarter, the content usage pattern could be determined to be a distribution of operations performed lying substantially (if not exclusively) within the quarter under consideration. Alternatively, the administrator can apply a rule within the content policy files 118 directing that financial documents within the specific folder should not be modified outside of the calendar interval of a specific financial quarter.

The content usage pattern, determined either from the pattern recognition module 110 or read from the content policy files 118, is provided to an outlier detection module 112. The outlier detection module 112 is a rule engine that applies the rules for different content usage patterns on the audit trail data captured for different content items. The resultant output from the outlier detection module 112 indicates the instances from the audit trail data deviating from the content usage pattern beyond that permitted by the applied rules, i.e., the outliers 4. The applied rules can include thresholds for acceptable variance in audit trail data. Where the audit trail data is a normal distribution, for example, the acceptable variance may be a number of standard deviations from a mean value. The rule can be independent of the distribution of the audit trail data where the content policy files 118 set rules based not on statistical variance, but rather upon specific conditions, such as when a specific folder including documents from a given quarter is accessed and a document therein modified in a later quarter.

Once the outlier 4 is identified, it can provided in a report so that the system administrator, the content administrator 6, an auditor, or an actor responsible for the content, can verify if the content operations indicate a fraud or indicate exceptional cases of genuine business activity. These can also be integrated with collaboration technologies such as email, instant messaging (IM), paging, text messaging, short message service (SMS) messaging, etc. to alert the system administrator of a suspected malicious activity. The system can further optionally comprise a feedback loop 122, whereby when an outlier is deemed a genuine business activity, future such outliers are not flagged and forwarded to responsible parties. The feedback loop can be automatic, or the system can require that an outlier be affirmatively added to a white list, i.e. a list of outliers deemed genuine business activities.

Figure 2:
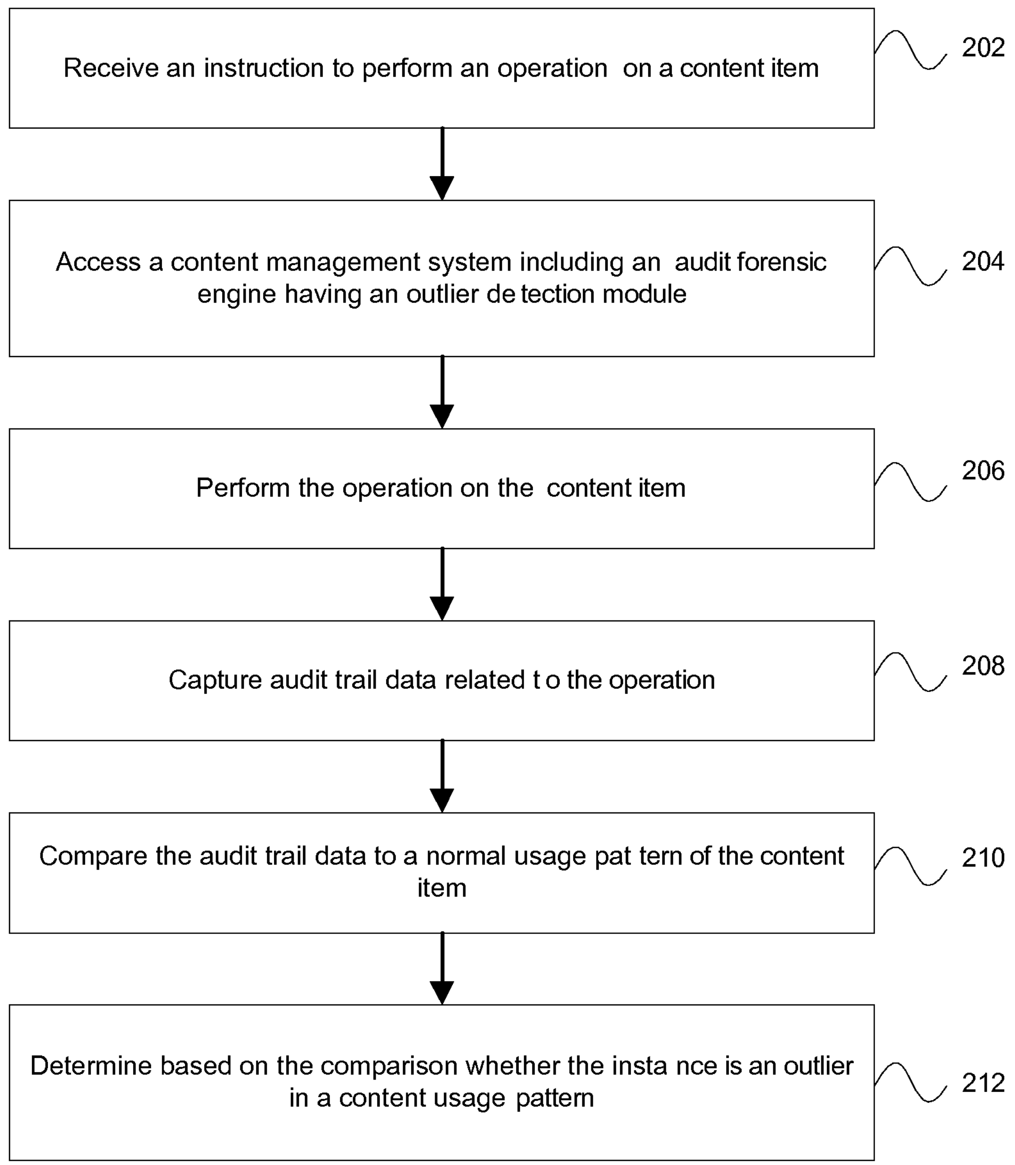
FIG. 2 shows a flowchart of a method of detecting an outlier in a content usage pattern in accordance with an embodiment of the invention.

FIG. 2 is a flowchart of a method of detecting an outlier in a content usage pattern in accordance with an embodiment of the present invention. An instruction is received to perform an operation on a content item (Step 202). A content management system is accessed, the content management system including an audit forensic engine having an outlier detection module (Step 204). The operation is performed on the content item (Step 206), and audit trail data related to the operation are captured (Step 208). The audit trail data can be captured, for example, by an audit framework within the content management system. The audit trail data are then compared to a content usage pattern of the content item (Step 210). As described above, the audit forensics engine can have a pattern recognition module and/or the content management system can include a content policy file. A pattern module analyses audit trail data related to previous instances wherein the operation is performed on the content item. The content policy file can include rules. The content usage pattern can, in certain embodiments, be determined based on one or both of the analysis of the pattern recognition module and the rules of the content policy file. It is then determined whether the operation performed on the content item is an outlier by comparing the audit trail data of the operation to the content usage pattern (Step 212). When an outlier is identified, the outlier can be reported to a responsible party, such as a content administrator. The audit trail data from the operation can then be stored in an audit repository.

While embodiments of systems and methods in accordance with the present invention have been described in the context of content management systems, in still other embodiments of systems and methods in accordance with the present invention, usage patterns can be analyzed for other applications, such as system management. For example, if with malicious intent (i.e. sabotage) or by accident an application administrator (or alternatively a database administrate ("DBA") or a server administrator) that has appropriate privileges, alters the system or otherwise makes changes that can affect system performance, deviations from normal usage patterns can be detected to alert of possible abuse of privilege. As above, audit trail data can be collected related to system access and activity. A usage pattern is generated by an audit forensics engine, either by a rules-based technique or pattern recognition, and the audit trail data is compared to the usage pattern to identify outliers. Outliers, as above, can be reported to a responsible party, such as the application administrator's superior.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

What is claimed is:

1. A system for detecting an outlier in a usage pattern, comprising:

a computer system operating on one or more microprocessors and accessible to perform an operation, the computer system including an audit forensics engine having an outlier detection module and a pattern recognition module;

wherein when an instance occurs where the operation is performed, audit trail data are captured related to the operation;

wherein the pattern recognition module statistically analyzes audit trail data related to previous instances when the operation was performed on the content item to generate a content usage pattern; and wherein the outlier detection module determines for the instance where the operation is performed whether the instance is an outlier in the content usage pattern based on a comparison of the audit trail data associated with the instance to the content usage pattern.

2. The system of claim 1, wherein:

the computer system is a content management system accessible to perform an operation on a content item;

the operation is performed on the content item; and the outlier detection module determines for the instance where the operation is performed on the content item whether the instance is an outlier based on a comparison of the audit trail data to a content usage pattern of the content item.

3. The system of claim 1, wherein:

the computer system is system management accessible to changes in modules of the system management;

the operation is performed on a module; and the outlier detection module determines for the instance where the operation is performed on the module whether the instance is an outlier based on a comparison of the audit trail data to a usage pattern of the module.

4. The system of claim 2, wherein the content management system includes a content policy file;

wherein the content policy file includes rules; and wherein the content usage pattern is determined based on one or both of the analysis of the pattern recognition module and the rules of the content policy file.

5. The system of claim 2, further comprising:

a reporting mechanism for reporting an outlier to a responsible party; and a feedback loop for modifying the pattern recognition module so that outliers having substantially the same audit trail data, which are part of a white list, are not reported by the reporting mechanism.

6. The system of claim 2, further comprising:

wherein the content management system is accessed by a user using a computer, or any computing device such as a tablet personal computer (PC), smart phone to perform an operation on a content item;

wherein the content management system further includes a content policy file;

wherein the content policy file includes rules; and wherein the outlier detection module determines for the instance where the operation is performed on the content item whether the instance is an outlier in a content usage pattern based on a comparison of the audit trail data to a content usage pattern of the content item;

wherein the content usage pattern is determined based on one or both of the analysis of the pattern recognition module and the rules of the content policy file.

7. A method of detecting an outlier in a usage pattern in a computer system operating on one or more microprocessors, comprising the steps of:

receiving an instruction to perform an operation;

accessing the computer system including an audit forensic engine having an outlier detection module and a pattern recognition module;

performing the operation;

capturing audit trail data related to the operation;

statistically analyzing audit trail data related to previous instances when the operation was performed to generate a usage pattern;

comparing the audit trail data related to the operation to the usage pattern; and determining based on the comparison whether the instance is an outlier in the usage pattern.

8. The method of claim 7, wherein:

the computer system is a content management system accessible to perform an operation on a content item;

the instruction received is to perform an operation on a content item;

the operation is performed on the content item; and the captured audit trail data is compared to a content usage pattern of the content item.

9. The method of claim 7, wherein:

the computer system is system management accessible to changes in modules of the system management;

the instruction received is to perform an operation on a module; and the operation is performed on the module;

the captured audit trail data is compared to a usage pattern of the module.

10. The method of claim 8, wherein the content management system includes a content policy file; and further comprising:

one or both of determining the content usage pattern based on the analysis of the pattern; and determining the content usage pattern based on the content policy file.

11. The method of claim 8, wherein the content management system includes an audit framework, a content repository storing the content item, and an audit repository for storing audit trail data; and further comprising:

accessing the content item from the content repository prior to performing the operation on the content item;

retrieving audit trail data related to previous instances prior to analyzing audit trail data related to previous instances;

storing the audit trail data related to the operation in the audit repository; and notifying a content administrator of the content item when the content item is determined to be an outlier.

12. The method of claim 11, further comprising:

receiving from the content administrator feedback that the outlier is an acceptable business activity and thereby part of a white list;

modifying one or both of the pattern recognition module and the content policy file so that the content administrator is not notified when instances having substantially the same audit trail data are determined to be outliers.

13. A non-transitory computer readable storage medium, including instructions stored thereon, which when read and executed by one or more microprocessors cause the one or more microprocessors to perform the steps comprising:

receiving an instruction to perform an operation;

accessing a computer system including an audit forensic engine having an outlier detection module and a pattern recognition module;

performing the operation;

capturing audit trail data related to the operation;

statistically analyzing audit trail data related to previous instances when the operation was performed to generate a usage pattern;

comparing the audit trail data related to the operation to the usage pattern; and determining based on the comparison whether the instance is an outlier in the usage pattern.

14. The non-transitory computer readable storage medium of claim 13, wherein:

the computer system is a content management system accessible to perform an operation on a content item;

the instruction received is to perform an operation on a content item;

the operation is performed on the content item; and the captured audit trail data is compared to a content usage pattern of the content item.

15. The non-transitory computer readable storage medium of claim 13, wherein:

the computer system is system management accessible to changes in modules of the system management;

the instruction received is to perform an operation on a module; and the operation is performed on the module;

the captured audit trail data is compared to a usage pattern of the module.

16. The non-transitory computer readable storage medium of claim 14, wherein when the content management system includes a content policy file defining the content usage pattern, the non-transitory computer readable storage medium further includes instructions stored thereon, which when read and executed by one or more microprocessors cause the one or more microprocessors to perform the steps further comprising:

one or both of determining the content usage pattern based on the analysis of the pattern; and determining the content usage pattern based on the content policy file.

17. The non-transitory computer readable storage medium of claim 14, wherein when the content management system includes an audit framework, a content repository storing the content item, and an audit repository for storing audit trail data, the non-transitory computer readable storage medium further includes instructions stored thereon, which when read and executed by one or more microprocessors cause the one or more microprocessors to perform the steps further comprising:

accessing the content item from the content repository prior to performing the operation on the content item;

retrieving audit trail data related to previous instances prior to analyzing audit trail data related to previous instances;

storing the audit trail data related to the operation in the audit repository; and notifying a content administrator of the content item when the content item is determined to be an outlier.

* * * * *

UNITED STATES PATENT AND TRADEMARK OFFICE

CERTIFICATE OF CORRECTION

PATENT NO. : 9,064,097 B2
APPLICATION NO. : 13/490069
DATED : June 23, 2015
INVENTOR(S) : Sambamurthy It is certified that error appears in the above-identified patent and that said Letters Patent is hereby corrected as shown below:

In drawings,

On sheet 2 of 2, in figure 2, under Reference Numeral 204, line 2, delete "de tection" and insert -- detection --, therefor.

On sheet 2 of 2, in figure 2, under Reference Numeral 208, line 1, delete "t o" and insert -- to --, therefor.

On sheet 2 of 2, in figure 2, under Reference Numeral 210, line 1, delete "pat tern" and insert -- pattern --, therefor.

On sheet 2 of 2, in figure 2, under Reference Numeral 212, line 1, delete "insta nce" and insert -- instance --, therefor.

Signed and Sealed this
Ninth Day of August, 2016

Michelle K. Lee
*Director of the United States Patent and Trademark Office*